(12) United States Patent
Seifi et al.

(10) Patent No.: US 10,027,908 B2
(45) Date of Patent: Jul. 17, 2018

(54) IMAGE SENSOR UNIT AND IMAGING APPARATUS

(71) Applicant: THOMSON LICENSING, Issy les Moulineaux (FR)

(72) Inventors: Mozhdeh Seifi, Thorigne-Fouillard (FR); Neus Sabater, Betton (FR); Valter Drazic, Betton (FR)

(73) Assignee: THOMSON Licensing, Issy-les-Moulineaux (FR)

( * ) Notice: Subject to any disclaimer, the term of this patent is extended or adjusted under 35 U.S.C. 154(b) by 0 days.

(21) Appl. No.: 15/533,029

(22) PCT Filed: Dec. 1, 2015

(86) PCT No.: PCT/EP2015/078154
§ 371 (c)(1),
(2) Date: Jun. 4, 2017

(87) PCT Pub. No.: WO2016/087415
PCT Pub. Date: Jun. 9, 2016

(65) Prior Publication Data
US 2017/0366765 A1    Dec. 21, 2017

(30) Foreign Application Priority Data
Dec. 4, 2014    (EP) ..................................... 14306949

(51) Int. Cl.
*H04N 5/355* (2011.01)
*H04N 5/225* (2006.01)
*H04N 5/235* (2006.01)

(52) U.S. Cl.
CPC ....... *H04N 5/35563* (2013.01); *H04N 5/2254* (2013.01); *H04N 5/2355* (2013.01)

(58) Field of Classification Search
CPC . H04N 5/35563; H04N 5/2355; H04N 5/2254
See application file for complete search history.

(56) References Cited

U.S. PATENT DOCUMENTS

| 7,271,937 B2 | 9/2007 | Schrey et al. |
| 8,228,417 B1 | 7/2012 | Georgiev et al. |

(Continued)

FOREIGN PATENT DOCUMENTS

| EP | 2566151 | 3/2013 |
| JP | 2013258602 | 12/2013 |

OTHER PUBLICATIONS

Georgiev et al., "Rich Image Capture with Plenoptic Cameras", 2010 IEEE International Conference on Computational Photography, Cambridge, Massachusetts, USA, Mar. 29, 2010, pp. 1-8.

(Continued)

*Primary Examiner* — Mekonnen Dagnew
(74) *Attorney, Agent, or Firm* — Brian J. Dorini; Jeffrey M. Navon

(57) ABSTRACT

An image sensor unit (3) includes a microlens array (31) and a sensor (32). The sensor includes a plurality of sensor regions (323) that respectively include pixels (322) having different sensitivities arranged in a matrix arrangement. The pixels (322) at corresponding positions of the plurality of sensor regions (323) have identical sensitivities. Each of the microlenses (311) of the microlens array (31) is arranged to direct the light to a corresponding one of the plurality of sensor regions (323) of the sensor (32). The pixels (322$c$1) in a first row or column of the matrix arrangement of each of the plurality of sensor regions (323) have a first light sensitivity, the pixels (322$c$2, 322$c$3) in a second row or column of the matrix arrangement of each of the plurality of sensor regions (323) have a second light sensitivity different from the first light sensitivity, and the first and second light sensitivities are different from the light sensitivities of the pixels (322) in rows or columns of the matrix arrangement other than the first and second rows or columns of the matrix arrangement of each of the plurality of sensor regions (323).

10 Claims, 4 Drawing Sheets

(56) References Cited

U.S. PATENT DOCUMENTS

| | | |
|---|---|---|
| 8,339,475 B2 | 12/2012 | Atanassov et al. |
| 2005/0099504 A1 | 5/2005 | Nayar et al. |
| 2006/0192867 A1 | 8/2006 | Yosefin |
| 2009/0091645 A1 | 4/2009 | Trimeche et al. |
| 2012/0268643 A1 | 10/2012 | Imamura |
| 2013/0128068 A1 | 5/2013 | Geogiev et al. |
| 2013/0147979 A1 | 6/2013 | McMahon et al. |
| 2013/0222652 A1 | 8/2013 | Akeley et al. |
| 2014/0132946 A1* | 5/2014 | Sebastian .............. G01J 3/0294 356/51 |
| 2014/0253767 A1 | 9/2014 | Kato et al. |
| 2018/0027196 A1* | 1/2018 | Yang .................. H04N 5/35563 |

OTHER PUBLICATIONS

Anonymous, "OV1064 Color CMOS 1.3 megapixel (1280x1080) High Dynamic Range(HDR) High Definition Image Sensor", Product Specification, OmniVision, http://www.ovt.com/products/sensor.php?id=151, Dec. 10, 2014, pp. 1-2.

Seifi et al., "Disparity-Guided Demosaicking of Light-Field Images", 2014 IEEE International Conference on Image Processing, Paris, France, Oct. 27, 2014, pp. 1-5.

Koifman, "ON Semi Presents EMCCD with Per-Pixel Switchable Gain, More", Image Sensors World, http://image-sensors-world.blogspot.fr/2014/11/on-semi-presents-emccd-with-per-pix, Nov. 4, 2014, pp. 1-11.

\* cited by examiner

IMAGE SENSOR UNIT AND IMAGING APPARATUS

This application claims the benefit, under 35 U.S.C. § 365 of International Application PCT/EP2015/078154, filed Dec. 1, 2015, which was published in accordance with PCT Article 21(2) on Jun. 9, 2016, in English, and which claims the benefit of European patent application No. 14306949.0 filed Dec. 4, 2016.

FIELD

The present disclosure generally relates to an image sensor unit and an imaging apparatus that includes such an image sensor unit.

BACKGROUND

Plenoptic cameras are able to measure the amount of light traveling along each bundle of rays that intersects a sensor, by arranging a microlens array between a main lens and the sensor. The light field can be post-processed to reconstruct images of a scene from different viewpoints. As a result, a user can change a focal point of the images. Compared to conventional cameras, the plenoptic camera can obtain additional optical information components for achieving the reconstruction of the images of the scene from the different viewpoints by post-processing.

A challenge in HDR (High Dynamic Range) imaging may be to capture at least two images of the scene with different exposures, in order to enable dynamic range extension. Therefore, dynamic scenes (or videos) cannot be processed with a satisfactory, or sufficiently high dynamic range according to the conventional cameras.

On the other hand, the plenoptic imaging has introduced an efficient way to capture several images of the scene simultaneously, providing a tool to capture multiple images of static (or still) scenes or dynamic scenes.

The images of the scene captured by the plenoptic camera must undergo view demultiplexing, that is, a data conversion from a two-dimensional (or 2D) raw image to a four-dimensional (or 4D) light-field image. The demultiplexing process reorganizes pixels of the 2D raw image in such a way that all pixels capturing the light rays with a certain angle of incidence are stored in the same image in order to create the so-called "views", or "viewpoint images". Each viewpoint image is a projection of the scene under a different light ray angle. A set of viewpoint images can create a block matrix in which a central viewpoint image stores the pixels capturing the light rays that pass through the central part of the main lens aperture. Angular information of the light rays is given by relative pixel positions in the microlens images (i.e., the images that are formed under microlenses and on the sensor) with respect to the pixel that corresponds to the central view point (the centers of the microlens images).

The block matrix can be used to estimate depth information of objects within the scene. Once the depth information is known, an image processing method can manipulate every object simultaneously on every viewpoint image. The HDR imaging is one example of such an image processing method. When a depth map of the scene is known, different exposures of the scene from different light ray angles can be used in various multi-frame HDR imaging methods to extend the dynamic range of the captured image.

For example, "OV10640", Color CMOS 1.3-megapixel (1280×1080) High Dynamic Range (HDR) High Definition Image Sensor, 'http://www.ovt.com/products/sensor.php?id=151', proposes a split-pixel technology in which some pixels have low sensitivity responses. However, the proposed split-pixel technology results in the loss of achievable spatial resolution of the camera. In addition, neighboring pixels sample different spatial positions, thereby reducing the accuracy of the post-processing performed by the HDR imaging methods.

On the other hand, Todor Georgiev et al., "Rich Image Capture with Plenoptic Cameras", ICCP 2010, proposes two approaches for the HDR imaging with plenoptic type 2. A first approach varies an aperture size of the microlenses in order to capture different exposures of the scene, and a second approach filters the main lens in order to vary the amount of light irradiated on the microlenses. However, according to the proposed first and second approaches, each demultiplexed view contains pixels from different exposures, and not pixels of a unique sensitivity. The second approach is reported in Todor Georgiev et al. to be poorer than the first approach, in terms of the quality of the results. Furthermore, according to the first approach, the dynamic range extension is limited by the lower bound on the aperture size, since the small aperture of the microlenses introduces diffraction blur.

Accordingly, it is conventionally difficult to simultaneously capture different exposures of a scene in one shot without lowering the spatial resolution. More particularly, it is conventionally difficult to simultaneously enable high and low exposure captures of the scene.

SUMMARY

According to an aspect of the present disclosure, an image sensor unit may include a microlens array including a plurality of microlenses arranged in a two-dimensional array; and a sensor, including a plurality of pixels arranged in a two-dimensional array, and configured to receive light through the microlens array, wherein the sensor includes a plurality of sensor regions that are arranged in a two-dimensional array and respectively include pixels having different sensitivities arranged in a matrix arrangement, wherein the pixels at corresponding positions of the plurality of sensor regions have identical sensitivities, and wherein each of the microlenses of the microlens array is arranged to direct the light to a corresponding one of the plurality of sensor regions of the sensor, the pixels in a first row or column of the matrix arrangement of each of the plurality of sensor regions have a first light sensitivity, the pixels in a second row or column of the matrix arrangement of each of the plurality of sensor regions have a second light sensitivity different from the first light sensitivity, the first and second light sensitivities are different from the light sensitivities of the pixels in rows or columns of the matrix arrangement other than the first and second rows or columns of the matrix arrangement of each of the plurality of sensor regions.

According to another aspect of the present disclosure, an imaging apparatus may include an optical system including at least a lens; and an image sensor unit described above, wherein the microlens array of the image sensor unit is configured to receive the light through the optical system.

The object and advantages of the present disclosure will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Embodiments of the present disclosure will be described with reference to the accompanying drawings.

A description will now be given of an image sensor unit and an imaging apparatus, in each embodiment according to the present disclosure.

Figure 1:
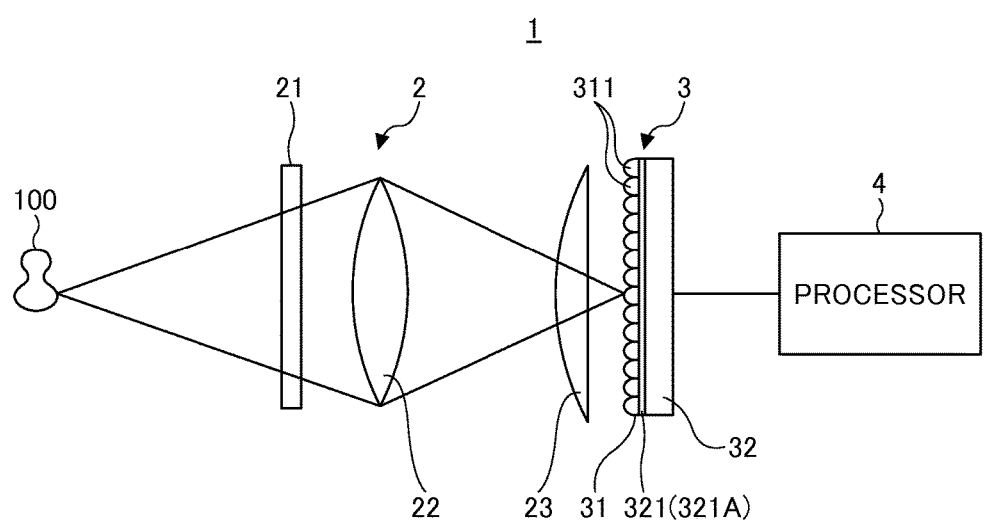
FIG. 1 is a diagram illustrating an example of an imaging apparatus in one embodiment of the present disclosure.

FIG. 1 is a diagram illustrating an example of the imaging apparatus in one embodiment of the present disclosure. An imaging apparatus 1 in this embodiment forms a plenoptic camera, for example. The imaging apparatus 1 illustrated in FIG. 1 may include an optical system 2, an image sensor unit 3, and a processor 4.

The optical system includes a diffuser 21, a main lens 22, and a field lens 23. The diffuser 21 diffuses the light from an object 100 prior to reaching the microlens array 31. This diffuser 21 may be omitted, if preferred. The main lens 22 receives light from the object 100 in an object field of the main lens 22 and passes the light through an image field of the main lens 22. The field lens 23 is arranged between the main lens 22 and the microlens array 31, and adjusts focused light from the main lens 22 so as to appear to be focused from infinity.

The image sensor unit 3 includes a microlens array 31 and a sensor 32. The microlens array 31 includes a plurality of microlenses 311 arranged in a two-dimensional array. The sensor 32 may include a color filter 321 provided on a sensing surface thereof. The color filter 321 may include filters of each of the colors red, green, and blue in a preferred arrangement, such as a Bayer arrangement, for example. This color filter 321 may be omitted, if preferred.

Figure 2:
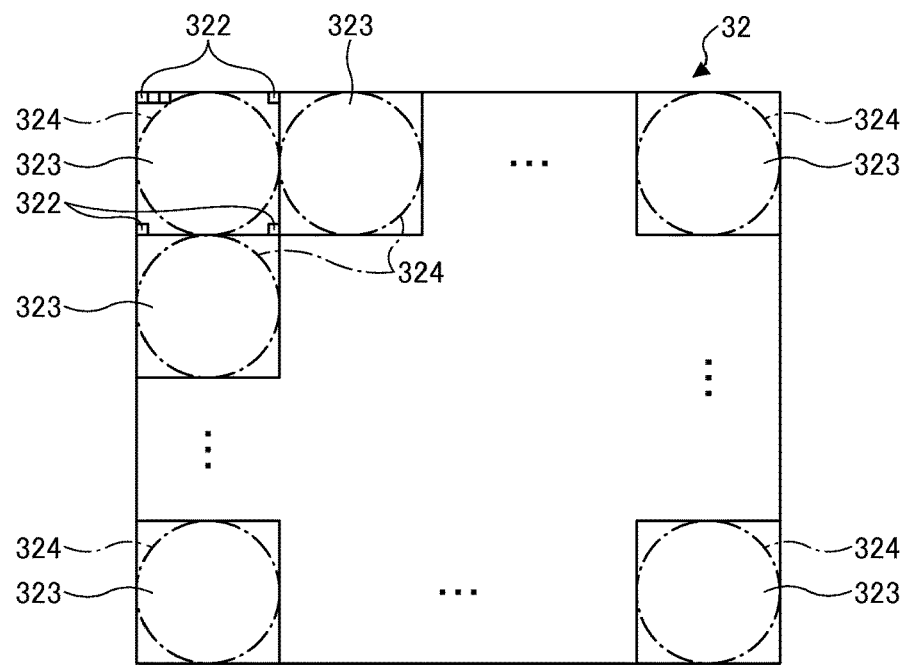
FIG. 2 is a plan view schematically illustrating an example of sensing regions arranged on a sensing surface of a sensor.

FIG. 2 is a plan view schematically illustrating an example of sensor regions arranged on the sensing surface of the sensor. As illustrated in FIG. 2, the sensor 32 includes a plurality of pixels 322 arranged in a two-dimensional array, and receives the light from the object 100 through the microlens array 31. The sensor 32 forms a plurality of sensor regions 323 that are arranged in a two-dimensional array and respectively include pixels 322 having mutually different sensitivities arranged in a matrix arrangement including M rows by N columns, where M and N are natural numbers greater than two. The sensor regions 323 are sometimes also referred to as "microlens images" or "blocks". In presence of the field lens 23, the shape and size of each of the sensor regions 323 are the same, and the number and arrangement of the pixels 322 within each of the sensor regions 323 are the same. In this example, the plurality of sensor regions 323 are arranged in a linearly aligned rectangular matrix arrangement in directions in which the rows and the columns extend. The pixels 322 at corresponding positions of the plurality of sensor regions 323 have identical sensitivities in currently available plenoptic cameras.

The pixels 322 in at least one row or column of each of the plurality of sensor regions 323, located at corresponding positions of the plurality of sensor regions 323, in a vicinity of a center of each of the plurality of sensor regions 323, may have identical sensitivities, as will be described later in conjunction with exemplary implementations. Here, the sensitivity of pixel can be generally interpreted as "the conversion rate between the number of photons that hit the pixel and the output signal". If the fill factor of a pixel is considered, it is refined as "the conversion rate between the number of photons that hit the light sensitive area of pixel and the output signal". The fill factor of a pixel may be defined as "the ratio of light sensitive area to total area of the pixel". This definition relies on a fact that some part of a pixel is generally dedicated to a circuit element of image sensor, thus not all area of the pixel is used for detecting light but only the light sensitive area of the pixel contributes to detect the light.

The various, different sensitivities of the pixels 322 may be achieved using pixels 322 that are manufactured to have different sensitivities. Pixels manufactured to have different sensitivities are known, as described in "http://image-sensors-world.blogspot.fr/2014/11/on-semi-presents-emccd-with-per-pixel.html", for example, and such pixels may be used for the pixels 322 having the various, different sensitivities described above.

Alternatively, the pixels 322 may be given the various, different sensitivities by using a filter 321A illustrated in FIG. 1 or the like, arranged between the microlens array 31 and the sensor 32, that varies a single sensitivity of the pixels 322 into the various, different sensitivities. The filter 321A may be manufactured to have a pattern in accordance with a pattern of the various, different sensitivities of the pixels 322 to be achieved. For example, the filter 321A may be provided on the color filter 321, or on the sensing surface of the sensor 32. Further, the filter 321A may be formed by the color filter 321, that is, functions of the color filter 321 and functions of the filter 321A may be integrated within a single filter.

Figure 3:
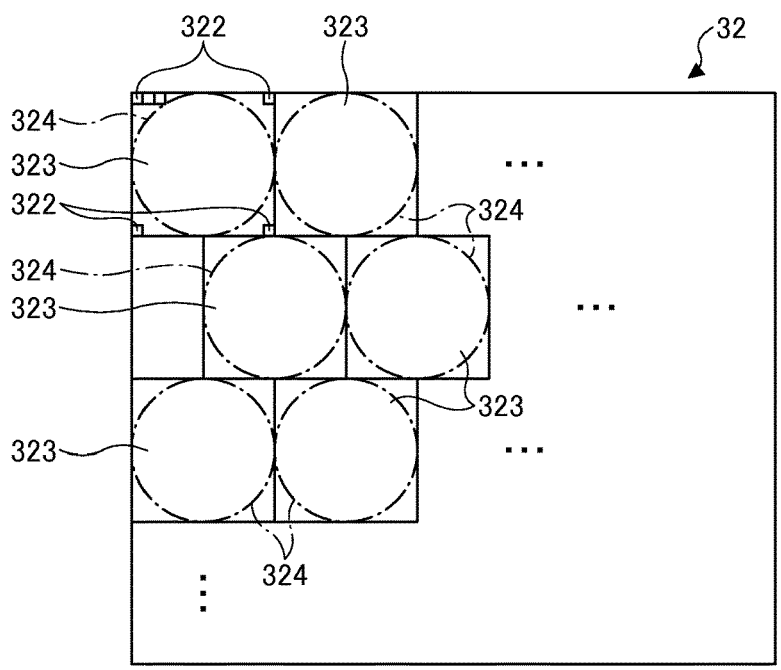
FIG. 3 is a plan view schematically illustrating another example of the sensing regions arranged on the sensing surface of the sensor.

FIG. 3 is a plan view schematically illustrating another example of the sensor regions arranged on the sensing surface of the sensor. In FIG. 3, those parts that are the same as those corresponding parts in FIG. 2 are designated by the same reference numerals, and a description thereof will be omitted. In this example, the plurality of sensor regions 323 are linearly arranged in a staggered arrangement in the directions in which the rows and the columns extend.

Each of the microlenses 311 of the microlens array 31 is arranged to direct the light to a corresponding one of the plurality of sensor regions 323 of the sensor 32. In addition, because of the lens properties of the microlenses 311, each of the microlenses 311 of the microlens array 31 directs the light to a circular area (or microlens image) 324, indicated by one-dot chain lines in FIGS. 2 and 3, within the corresponding one of the plurality of sensor regions 323 of the sensor 32.

In this example, the sensor regions 323 have a square shape, and the circular area 324 fits within each corresponding, square sensor region 323. Preferably, an outer contour of the circular area 324 forms an inscribed circle with respect to the corresponding, square sensor region 323. Hence, amongst all of the pixels 322 within each sensing region 323, only the pixels 322 located substantially inside the circular area 324 contribute to the imaging. In other words, a pixel area (or sensing area) of each pixel 322 that contributes to the imaging is located substantially inside the circular area 324.

The center of each of the plurality of sensor regions 323 matches a center of the corresponding circular area 324, that is, a center of the corresponding microlens image 311.

The processor 4 may be formed by any known and suitable hardware, or software, or a combination of hardware and software. For example, the processor 4 may be formed by dedicated hardware such as a processing circuit, or by a programmable processing unit such as a CPU (Central Processing Unit) that executes a program stored in a memory thereof.

The processor 4 may perform a process on signals output from each of the plurality of sensor regions 323 of the sensor 32, including signals of the pixels 322 having different sensitivities. The process of the processor 4 may include digitizing the signals into digital signals, and extracting, from the digital signals, a plurality of viewpoint images sensed by the plurality of sensor regions 323 and corresponding to different viewpoints. The process of the processor 4 may further include synthesizing at least two of the plurality of viewpoint images, for example. The process of the processor 4 may enable extraction of depth information from the signals output from the sensor 32, and enable a three-dimensional display based on the depth information, for example.

A number of different sensitivities, S, of the pixels 322 in the sensor 32, may be represented by a formula $S=m-(L1\times L2)+L1$, where m denotes a number of pixels 322 contributing to the imaging within the circular area 324, L1 denotes a number of rows or columns of each of the plurality of sensor regions 323, respectively formed by the pixels 322 having identical sensitivities, and L2 denotes a number of pixels 322 contributing to the imaging within each of L1 rows or columns of each of the plurality of sensor regions 323, formed by the pixels 322 having identical sensitivities. As a result, this embodiment can simultaneously capture different exposures of a scene in one shot without lowering the spatial resolution of the plenoptic data. More particularly, this embodiment can simultaneously enable high and low exposure captures of the scene.

The simultaneous capture of the different exposures of the scene facilitates the HDR (High Dynamic Range) imaging for the static scenes and the dynamic scenes. In this case, a user does not need to consider low-light exposures and manual exposure mode changes, for example. The high and low exposure captures can all be made in one fixed mode, for example, and the plenoptic camera can work in a wide range of illumination conditions. Further, the image capture for tetrachromatic people, for example, can easily be implemented in the plenoptic camera.

Instead of changing the aperture of microlenses as proposed in Todor Georgiev et al., "Rich Image Capture with Plenoptic Cameras", ICCP 2010, the arrangement of the sensor pixels in this embodiment are designed so that the sensitivity of pixels vary on the sensor. In addition, unlike the low spatial resolution of the split-pixel technology proposed in "OV10640", Color CMOS 1.3-megapixel (1280×1080) High Dynamic Range (HDR) High Definition Image Sensor, 'http://www.ovt.com/products/sensor.php?id=151', changing the pixel sensitivities of the plenoptic camera (or light field camera) as in this embodiment does not influence the spatial resolution and/or the angular resolution of the captured light field.

Hence, in this embodiment, the sensor includes pixels having several different sensitivities to light. Restrictions (i)-(v) on the pixel arrangement design may be as follows. The exemplary implementations consider a typical type 1 plenoptic camera having 10×10=100 pixels under each microlens, that is, within each sensing region 324. According to other examples, each sensing region may comprise 20×20, 50×50 or even 100×100 pixels.

Restriction (i): In order to capture each viewpoint image only by the pixels having the same sensitivity, all of the pixels that are positioned at the same relative location (that is, same coordinates relative to the microlens center) within each of the sensing regions 324, and thus belonging to the same viewpoint image, have the same sensitivity.

Restriction (ii): In order to enable calculation of the depth map, at least two views with the same exposure are required. In order to increase the accuracy of disparity estimation, at least one complete row or column in each of the sensing regions is preferably formed by the pixels having the same sensitivity. This sensitivity pattern of the pixels allows for accurate pixel registration.

Figure 4:
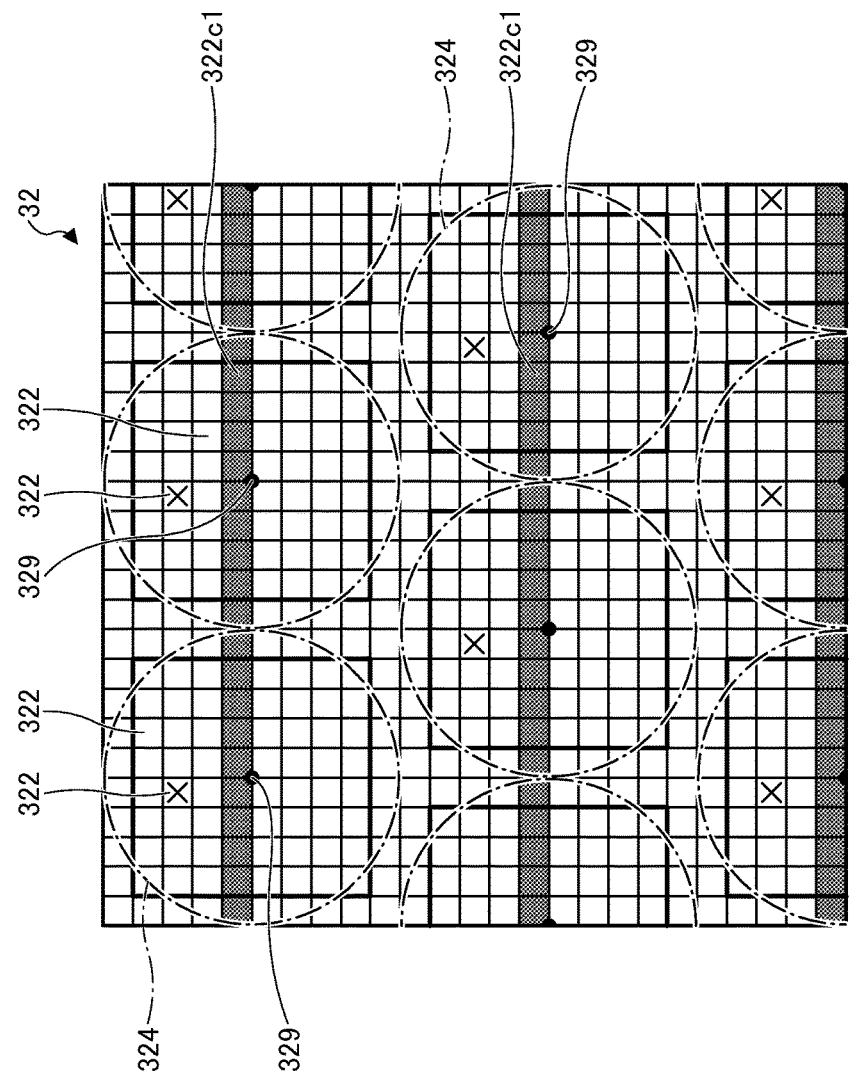
FIG. 4 is a plan view schematically illustrating a first exemplary implementation of sensing regions arranged on a part of the sensing surface of the sensor.

FIG. 4 is a plan view schematically illustrating a first exemplary implementation of sensing regions arranged on a part of the sensing surface of the sensor. In FIG. 4, those parts that are the same as those corresponding parts in FIG. 3 are designated by the same reference numerals, and a description thereof will be omitted. The circular areas 324 in a partial view of the sensor 32 correspond to the microlens images. A central row of each of the sensing regions 323, in a vicinity of the center 329, is only formed by one type of pixels 322c1 having the same sensitivity and indicated by hatching in FIG. 4. It should be considered that the central row is in a vicinity of the center 329 when at least one pixel of the row touches the center 329 or when a pixel of the row which is closest to the center 329 is located in the neighborhood of the center 329, for example away from the center 329 in a few of several pixels depending on the size of number of the pixels. The pixels 322 in rows other than the central row have mutually different sensitivities. In addition, as indicated by marks "x" in FIG. 4, for example, the pixels 322 that are positioned at the same relative location within each of the sensing regions 323 (or circular areas 324), and thus belonging to the same viewpoint image, have the same sensitivity. Hence, amongst 64 pixels (322 and 322c1) surrounded by a bold solid line in FIG. 4 and contributing to the imaging within the circular area 324 under each microlens 311, only 8 pixels 322c1 have the same sensitivity, and it may be calculated from the formula described above that the pixels (322 and 322c1) contributing to the imaging within each circular area 324 can have 64−(1×8)+1=57 different sensitivities.

Figure 5:
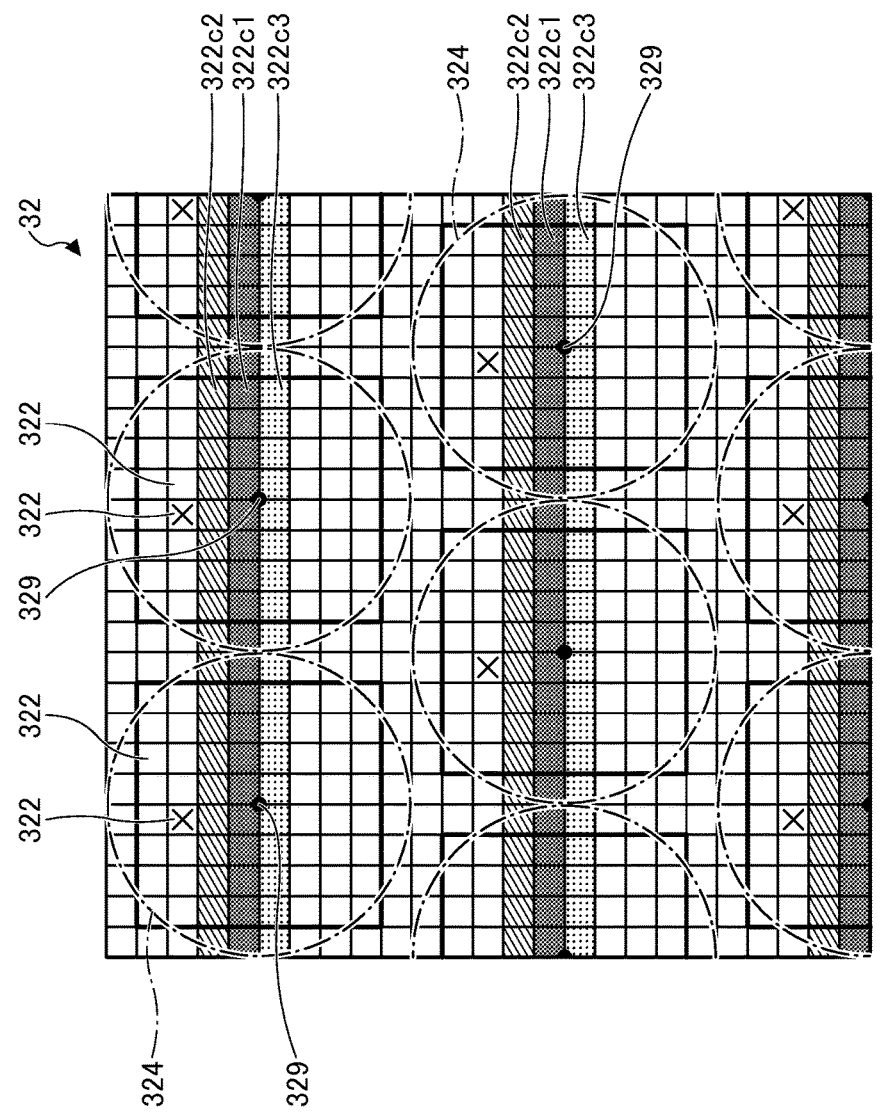
FIG. 5 is a plan view schematically illustrating a second exemplary implementation of sensing regions arranged on a part of the sensing surface of the sensor.

In FIG. 4 and FIG. 5 which will be described later, it is assumed for the sake of convenience that the 64 (=8×8) pixels in a square region surrounded by the bold line contribute to the imaging, although the pixels at corners of the square region may appear in these figures as not being located substantially inside the circular area 324.

Restriction (iii): In order to allow continuous image capture at different illumination levels, more restrictions may be applied on the pixel arrangement design. For example, each of a plurality of central rows or columns in each of the sensing regions is preferably formed by the pixels having the same sensitivity. This sensitivity pattern of the pixels also allows for accurate pixel registration. The depth map estimation may be performed on the one of the central rows or columns that best captures the scene, regarding the illumination level.

FIG. 5 is a plan view schematically illustrating a second exemplary implementation of the sensing regions arranged on a part of the sensing surface of the sensor. In FIG. 5, those parts that are the same as those corresponding parts in FIG. 3 are designated by the same reference numerals, and a description thereof will be omitted. The circular areas 324 in a partial view of the sensor 32 correspond to the microlens images. Each of first, second, and third central rows of each of the sensing regions 323, in a vicinity of the center 329, is only formed by a corresponding type of pixels 322$c$1, 322$c$2, and 322$c$3, respectively, having the same sensitivity and indicated by hatching in FIG. 5. The pixels 322 in rows other than the first, second, and third central rows have mutually different sensitivities. The sensitivities of the pixels 322$c$1, 322$c$2, and 322$c$3 may be determined by considering two extreme lighting conditions, namely, very low illumination and very high illumination corresponding to high and low sensitivities, respectively, and one medium lighting condition corresponding to a middle sensitivity between the high and low sensitivities.

Hence, amongst 64 pixels (322, 322$c$1, 322$c$2, and 322$c$3) surrounded by the bold solid line in FIG. 5 and contributing to the imaging within the circular area 324 under each microlens 311, 8 pixels 322$c$1 have the same sensitivity, 8 pixels 322$c$2 have the same sensitivity, 8 pixels 322$c$3 have the same sensitivity, but the sensitivities of the pixels 322$c$1, 322$c$2, and 322$c$3 are mutually different. Hence, it may be calculated from the formula described above that the pixels (322, 322$c$1, 322$c$2, and 322$c$3) contributing to the imaging within each circular area 324 can have 64−(3×8)+3=43 different sensitivities.

Restriction (iv): The color filter 321 may be provided on the sensor 32 in order to sample scene chromatic content. Knowing the microlens centers, the color filter 321 can be designed to obtain the regular Bayer arrangement (or pattern) on each view, for example. This color filter design may be achieved in a case in which the diameter of each microlens 311 corresponds to an exact odd number of pixels 322. In a case in which the diameter of the microlens 311 corresponds to an exact even number of pixels 322, a physical space of one pixel can be formed between the microlenses 311 on the microlens grid. For accurate recovery of the color content of views using the estimated disparities, a method proposed in Mozhdeh Seifi et al, "Disparity-Guided Demosaicking of Light-Field Images", ICIP 2014, for example, may be implemented so that the number of sensitivities (or sensitivity levels) can further be reduced in order to obtain more than one view per exposure. Even in a case in which the number of sensitivity levels is divided by 2, for example, approximately 20 different exposures of the scene can be captured, which is far beyond the reach of the conventional cameras.

Restriction (v): The scene capture for tetrachromatic people may be considered. Very few in number, tetrachromatic people have 4 primitive color responses. Therefore, using only 3 color channels may not satisfy the needs of these people. In order to adjust the HDR plenoptic camera to this case, one view (or even possibly one row or column of views) may be included in the information in the additional color channel. The only adjustment is to use a suitable color filter in front of the pixels corresponding to each microlens, and it is still possible to capture approximately 20 different exposures of the scene.

As described above, the pixels 322 in at least one row or column of each of the plurality of sensor regions 323, located at corresponding positions of the plurality of sensor regions 323, in a vicinity of a center of each of the plurality of sensor regions 323, may have identical sensitivities. Hence, the number of adjacent rows or columns in which the pixels 322 have identical sensitivities in each sensor region 323 may be one (1) as illustrated in FIG. 4, three (3) as illustrated in FIG. 5, or two (2) or four (4) or more, where the sensitivities of the pixels 322 are different between such adjacent rows or columns.

It is to be noted that the plenoptic camera obtains several exposures of the scene in one shot, and can easily work in a video mode, for example. Although the example of plenoptic type 1 is provided in this embodiment, the exact same approach can be used for plenoptic type 2 cameras, for example. In the case of R-Series 3D cameras (or light field cameras) manufactured by Raytrix GmbH, for example, since the plenoptic function is not sampled on a regular grid, data re-gridding is required to obtain the matrix arrangement of views. Nevertheless, the sensor can be designed accordingly in order to obtain different exposures of the scene on different views.

Although the exemplary implementations are numbered with, for example, "first," or "second," the ordinal numbers do not imply priorities of the exemplary implementations. Many other variations and modifications will be apparent to those skilled in the art.

All examples and conditional language recited herein are intended for pedagogical purposes to aid the reader in understanding the invention and the concepts contributed by the inventors to furthering the art, and are to be construed as being without limitation to such specifically recited examples and conditions, nor does the organization of such examples in the specification relate to a showing of the superiority and inferiority of the present principles. Although the embodiments of the present disclosure have been described in detail, it should be understood that the various changes, substitutions, and alterations could be made hereto without departing from the scope of the invention.

The invention claimed is:

1. An image sensor unit comprising:
a microlens array including a plurality of microlenses arranged in a two-dimensional array; and
a sensor, including a plurality of pixels arranged in a two-dimensional array, and configured to receive light through the microlens array,
wherein the sensor includes a plurality of sensor regions that are arranged in a two-dimensional array and respectively include pixels having different light sensitivities arranged in a matrix arrangement,
wherein the pixels at corresponding positions of the plurality of sensor regions have identical light sensitivities, and
wherein each of the microlenses of the microlens array is arranged to direct the light to a corresponding one of the plurality of sensor regions of the sensor,
the pixels in a first row or column of the matrix arrangement of each of the plurality of sensor regions have a first light sensitivity,
the pixels in a second row or column of the matrix arrangement of each of the plurality of sensor regions have a second light sensitivity different from the first light sensitivity,
the first and second light sensitivities are different from the light sensitivities of the pixels in rows or columns of the matrix arrangement other than the first and second rows or columns of the matrix arrangement of each of the plurality of sensor regions.

2. The image sensor unit as claimed in claim 1, wherein
the pixels in a third row or column of the matrix arrangement of each of the plurality of sensor regions have a third light sensitivity different from the first and second light sensitivities,
the first, second, and third light sensitivities are different from the light sensitivities of the pixels in rows or columns of the matrix arrangement other than the first, second, and third rows or columns of each of the plurality of sensor regions,
the first, second, and third rows or columns are adjacent to each other and are located to extend through the central area of each of the plurality of sensor regions.

3. The image sensor unit as claimed in claim 1, wherein the plurality of sensor regions are arranged in a linearly aligned matrix arrangement in directions in which the rows and the columns extend.

4. The image sensor unit as claimed in claim 1, wherein the plurality of sensor regions are linearly arranged in a staggered arrangement in directions in which the rows and the columns extend.

5. An imaging apparatus comprising:
an optical system including at least a lens; and
an image sensor unit as claimed in claim 1,
wherein the microlens array of the image sensor unit is configured to receive the light through the optical system.

6. The imaging apparatus as claimed in claim 5, wherein the optical system includes a main lens configured to receive the light from an object in an object field of the main lens and to pass the light through an image field of the main lens.

7. The imaging apparatus as claimed in claim 5, further comprising:
a processor configured to perform a process on signals output from each of the plurality of sensor regions of the sensor, including signals of the pixels having different sensitivities.

8. The imaging apparatus as claimed in claim 7, wherein the process of the processor includes
digitizing the signals into digital signals, and
extracting, from the digital signals, a plurality of viewpoint images sensed by the plurality of sensor regions and corresponding to different viewpoints.

9. The imaging apparatus as claimed in claim 8, wherein the process of the processor further includes
synthesizing at least two of the plurality of viewpoint images.

10. The imaging apparatus as claimed in claim 5, wherein the imaging apparatus is a plenoptic camera.

* * * * *